United States Patent [19]

Calandra, Jr.

[11] Patent Number: 5,445,477
[45] Date of Patent: Aug. 29, 1995

[54] BEARING PLATE WITH A CONTINUOUS ELLIPTICAL EMBOSSMENT

[75] Inventor: Frank Calandra, Jr., Pittsburgh, Pa.

[73] Assignee: Jennmar Corporation, Pittsburgh, Pa.

[21] Appl. No.: 173,470

[22] Filed: Dec. 23, 1993

Related U.S. Application Data

[63] Continuation of Ser. No. 893,557, Jun. 3, 1992, abandoned, which is a continuation of Ser. No. 674,799, Mar. 25, 1991, abandoned.

[51] Int. Cl.$^6$ .................... F16B 43/00; E21D 21/00
[52] U.S. Cl. ................. 405/259.1; 411/371; 411/531; 411/545
[58] Field of Search ............ 405/259.1–259.6; 411/371, 531, 545; 248/346

[56] References Cited

U.S. PATENT DOCUMENTS

| 3,544,053 | 12/1970 | Ingalls | 411/531 X |
|---|---|---|---|
| 4,095,430 | 6/1978 | Hannan | 405/259 |
| 4,249,835 | 2/1981 | White | 405/259 |
| 4,334,803 | 6/1982 | Westlake et al. | 405/259 |
| 4,476,660 | 10/1984 | Francovitch | 405/259 |
| 4,498,815 | 2/1985 | Dye | 405/259 |
| 4,507,020 | 3/1985 | Zeitler et al. | 405/259 |
| 4,708,559 | 11/1987 | Locotos | 411/545 |
| 4,859,118 | 8/1989 | Schaeffer | 405/259 |
| 5,102,275 | 4/1992 | Hulsey | 411/545 X |

FOREIGN PATENT DOCUMENTS

| 1296709 | 5/1962 | France | 411/531 |
|---|---|---|---|
| 7415863 | 6/1976 | Netherlands | 411/545 |
| 104623 | 3/1917 | United Kingdom | 411/531 |

*Primary Examiner*—Randolph A. Reese
*Assistant Examiner*—John A. Ricci
*Attorney, Agent, or Firm*—Webb Ziesenheim Bruening Logsdon Orkin & Hanson

[57] ABSTRACT

A bearing plate with side walls longer than end walls so that the bearing plate has a rectangular configuration and a continuous elliptical embossment extending along the side walls and the end walls of the plate. An aperture concentrically positioned at the midpoint of the plate. The plate has a bearing surface and an opposite surface, and the continuous elliptical embossment extends from the opposite surface continuously along and inwardly of the perimeter of the bearing plate. Inner embossed areas may extend from the opposite surface on either side of the aperture along the longitudinal axis.

9 Claims, 2 Drawing Sheets

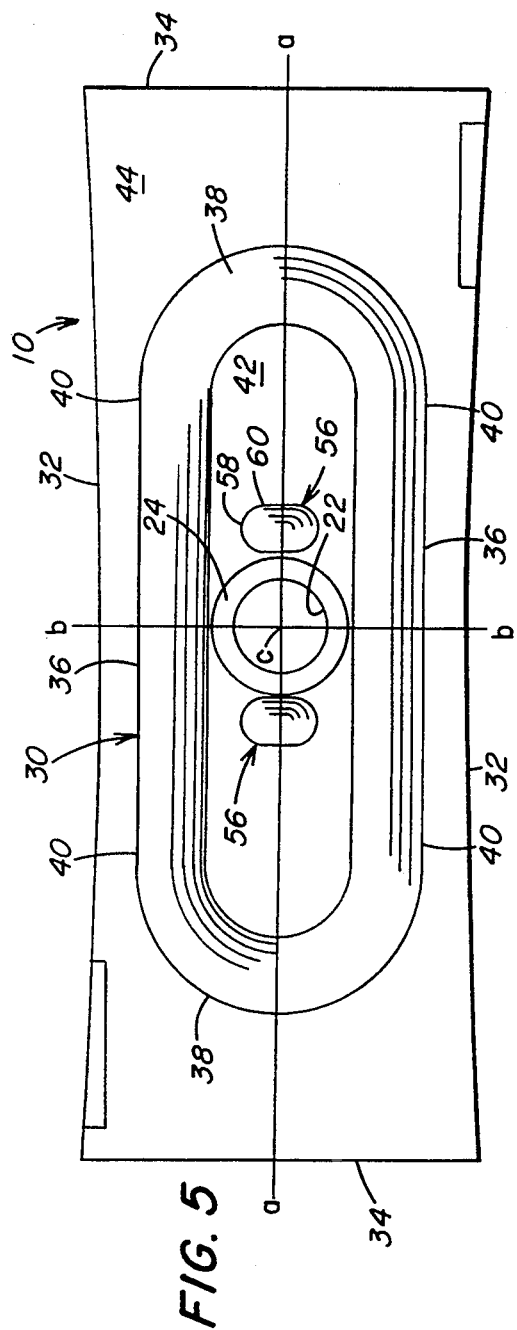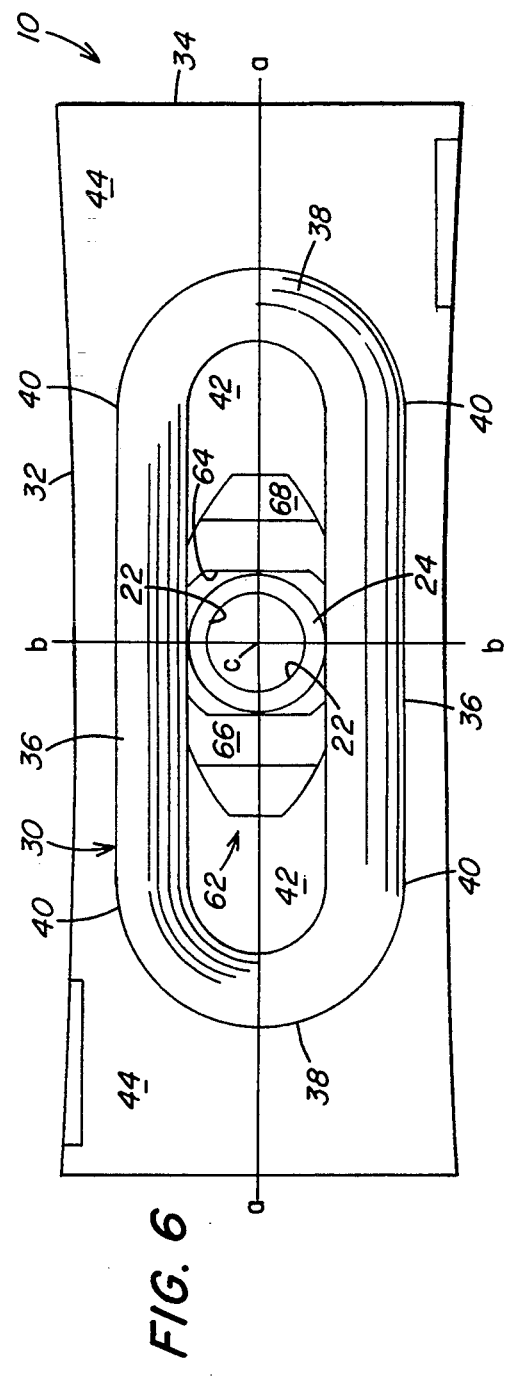

BEARING PLATE WITH A CONTINUOUS ELLIPTICAL EMBOSSMENT

CROSS REFERENCE TO RELATED APPLICATIONS

This application is a continuation of application Ser. No. 893,557 filed Jun. 3, 1992 now abandoned which is a continuation of Ser. No. 674,799 filed on Mar. 25, 1991 entitled "Bearing Plate With A Continuous Elliptical Embossment", now abandoned.

BACKGROUND OF THE INVENTION

1. Field of the Invention

This invention relates to a bearing plate for use with a mine roof bolt, and more particularly, to a bearing plate which includes a continuous elliptical embossment having a pair of straight portions extending along the side walls of the plate with the ends thereof joined by curved portions adjacent the end walls of the plate.

2. Description of the Prior Art

In underground mining, it is well known to provide support for mine roofs by means of a mine roof bolts extending in and anchored to bore holes in the mine roof with bearing plates extending around a portion of the mine roof bolt projecting from the bore hole. The mine roof bolt is anchored in the bore hole by mechanical means, resin or a combination of the two, and the mine roof anchor bolt is torqued in the bore hole after anchorage is achieved with the resultant effect of tensioning the bearing plate against the area of the mine roof adjacent the bore hole.

Various types of header plates having different configurations are known.

Generally, bearing plates have apertures at the midpoint of the plate, bearing surfaces for abutment against the mine roof, and another surface opposite the bearing surface from which extend embossments.

U.S. Pat. No. 4,037,418, U.S. Pat. No. RE B1 4,037,418, U.S. Pat. No. 4,095,430 and U.S. Pat. No. 4,095,431 disclose an embossment concentrically disposed around the midpoint of the bearing plate and having extensions therefrom extending toward the plate end walls.

U.S. Pat. No. 4,249,835 discloses a rectangular bearing plate with embossments extending longitudinally along the longer walls and centering ribs extending adjacent the aperture.

U.S. Pat. No. 4,371,293 discloses a bearing plate with an embossment concentrically disposed around the aperture, supporting rib type embossments extending therefrom toward the corners of the bearing plate, and embossments extending between the ribs adjacent the sides of the plate.

U.S. Pat. No. 4,445,808 discloses a bearing plate having a circular inner surface surrounded by a square outer surface around the aperture with the sides of the square inner surface parallel to the sides of the bearing plate. The embossment extends from the square outer surface upwardly toward the circular inner surface which is spaced from the opposite surface of the bearing plate. The circular inner surface includes an aperture in the bearing plate.

U.S. Pat. No. 4,498,815 discloses a bearing plate having embossments extending along opposite sides thereof, and aperture and embossments between the longitudinally extending embossments on either side of the aperture.

U.S. Pat. No. 4,507,020 discloses a rectangular bearing plate having embossments on either side of the aperture at the midpoint, and rods extending in longitudinally extending grooves adjacent the end parallel to the long sides of the rectangle.

U.S. Pat. No. 4,518,282 and U.S. Pat. No. 4,746,248 disclose a generally square bearing plate having an embossment concentrically disposed around the aperture at the midpoint thereof.

Although the prior art discloses bearing plates including various embossed areas or portions, there is a need for an improved bearing plate having a continuous embossment around the perimeter thereof to reinforce the bearing plate and to prevent buckling of the plate when subjected to the tension on the bolt head. There also remains a need for a bearing plate having a continuous embossment around the outer perimeter thereof such that stresses are transferred away from a localized stress point to the other portions of the continuous embossment due to the continuous configuration of the embossed area around the perimeter of the bearing plate to provide a bearing plate with increased resistance to localized stresses.

SUMMARY OF THE INVENTION

In accordance with the present invention, there is provided a bearing plate for use with a means for supporting a mine roof which includes a bearing plate having a generally rectangular configuration, a bearing surface for abutment against the mine roof, an opposite surface, and an embossed area extending continuously around the perimeter of the opposite surface of the bearing plate. The rectangular configuration of the bearing plate is defined by side walls having a length greater than the length of the end walls. The continuous embossment extends from the opposite surface of the bearing plate adjacent to the side walls. The single continuous embossment has linear portions that are joined by curved portions adjacent the end walls or edges of the plate to thus form a single continuous embossment around the perimeter of the bearing plate.

The bearing plate has a longitudinal axis parallel to the side walls and a transverse axis parallel to the end walls or edges. The longitudinal and transverse axes intersect at the midpoint of the bearing plate. An aperture is provided at the midpoint of the bearing plate.

In another embodiment of the invention, there is provided a bearing plate with a bearing surface and an opposite surface, a continuous embossment having a pair of linear embossment portions extending from the opposite surface along the side walls of the bearing plate. The linear portions are joined by curved segments adjacent to the edges or end walls of the bearing plate to form a continuous elliptical embossment along the perimeter thereof. The end walls of the bearing plate have a shorter length than the side walls of the bearing plate so that the bearing plate has a rectangular configuration. The bearing plate has a longitudinal axis parallel to the side walls and a transverse axis parallel to the end walls or edges of the bearing plate. The longitudinal and transverse axes intersect at the midpoint of the bearing plate, and an aperture is provided concentrically around the midpoint of the bearing plate. A pair of inboard embossed areas extend from the opposite surface of the bearing plate inboard of the continuous elliptical embossed area on opposite sides of the aperture. The inboard embossed areas have side walls and curved end walls. The side walls of the inboard embossed areas are longer than the end walls thereof, and the side walls of the inboard embossed area are parallel to the longitudinal axis of the bearing plate. The inboard embossed areas are centered within the continuous embossed area parallel to the longitudinal axis of the bearing plate.

In yet another embodiment of the present invention, there is provided a bearing plate with a bearing surface and an opposite surface. The bearing plate has side walls which have a length greater than the length of the end walls thereof to provide the bearing plate with a rectangular configuration. A continuous elliptical embossed area extends outwardly from the opposite surface of the bearing plate adjacent to the side walls and end walls. The end portions of the continuous embossed area are joined by curved segments adjacent to the edges or end walls of the plate to form a continuous elliptical embossment around the perimeter thereof. The bearing plate has a longitudinal axis parallel to the side walls and a transverse axis perpendicular to the longitudinal axis. The longitudinal and transverse axes intersect in the center or midpoint of the bearing plate. An aperture is provided concentrically around the center or midpoint of the bearing plate. Inboard embossed areas extending from the opposite surface are provided on either side of the aperture along the longitudinal axis of the bearing plate inboard of the major embossed area. The inboard embossed areas have side walls which are longer than curved end walls thereof. The side walls of the inboard embossed areas are parallel to the transverse axis of the bearing plate.

In yet another embodiment of the present invention, there if provided a bearing plate with a bearing surface and an opposite surface. The bearing plate has side walls with a length greater than the length of end or edge walls such that the bearing plate has a rectangular configuration. A continuous elliptical embossed area extends outwardly from the opposite surface of the bearing plate and adjacent to the side walls and end walls of the bearing plate. The end portions of the continuous embossment are curved segments adjacent the edges or end walls of the plate to provide a bearing plate with a continuous elliptical embossment around the periphery of the bearing plate. The bearing plate has a longitudinal axis parallel to the side walls and a transverse axis parallel to the end walls or edges of the bearing plate. The longitudinal and transverse axes intersect at the midpoint of the bearing plate. An aperture is provided concentrically around the midpoint of the bearing plate. Inboard embossed areas are provided on either side of the aperture within the continuous embossment along the longitudinal axis of the bearing plate. The inboard embossed areas extend from the opposite surface of the bearing plate from an area of maximum height adjacent the aperture.

Accordingly, the principal object of the present invention is to provide a bearing plate having a bearing surface and an opposite surface, side walls having a length greater than the length of end walls such that the bearing plate has a rectangular configuration, a longitudinal axis parallel to the side walls and a transverse axis parallel to the end walls, an aperture concentrically disposed around the midpoint of the bearing plate, and a continuous elliptical embossed area around the periphery of the bearing plate to give greater rigidity to the bearing plate and which divides the bearing plate into an outer surface in the same plane as an inner surface of the bearing plate, the inner surface being inboard of the continuous embossed area and the outer surface being outboard of the continuous embossed area on the periphery of the bearing plate.

Another object of the present invention is to provide a bearing plate with a rectangular configuration defined by side walls having a length greater than the length of the end walls, a longitudinal axis parallel to the side walls and a transverse axis parallel to the end walls, with the longitudinal and transverse axes intersecting along the midpoint of the bearing plate, the aperture provided concentrically around the midpoint of the bearing plate, a continuous elliptical embossed area having a pair of side portions extending along the side walls of the plate and the ends thereof joined by curved segments adjacent the edges or end walls of the plate to form a continuous elliptical embossed area, and inboard embossed areas on opposite sides of the aperture along the longitudinal axis of the bearing plate inboard of the continuous elliptical embossment to provide additional rigidity to the bearing plate and to provide a means for centering a washer around the aperture in the bearing plate.

There and other objects of the present invention will be more completely disclosed and described in the following specification, accompanying drawings, and appended claims.

BRIEF DESCRIPTION OF THE DRAWINGS

FIG. 5 is another top plan view of yet another embodiment of the present invention.

FIG. 6 is yet another top plan view of yet another embodiment of the present invention.

DESCRIPTION OF THE PREFERRED EMBODIMENTS

Figure 1:
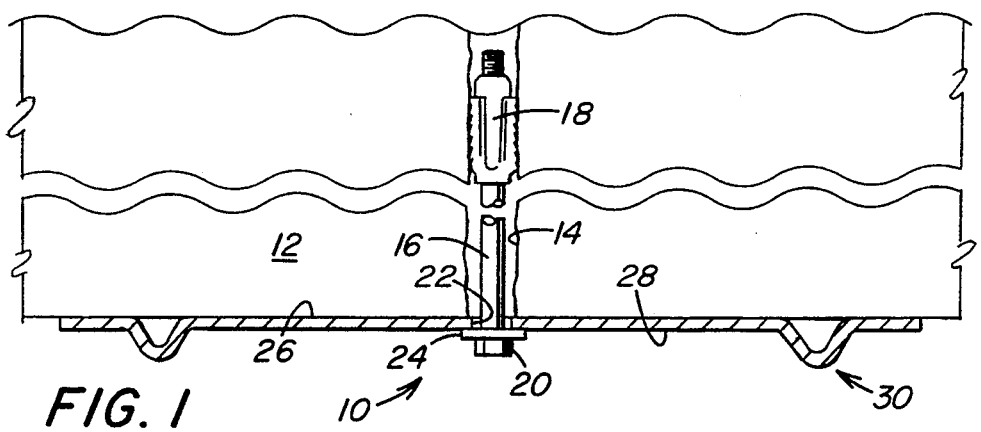
FIG. 1 is a view in cross section of the bearing plate of the present invention retained on a mine roof by means of a mine roof bolt with an associated expansion assembly.
Figure 2:
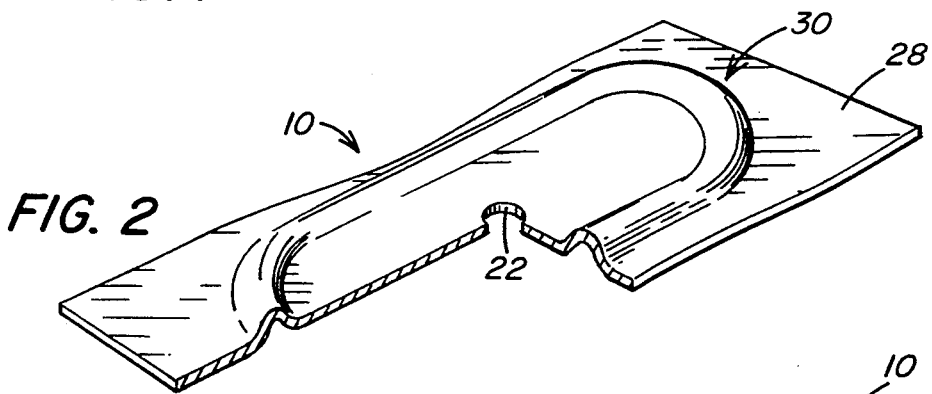
FIG. 2 is a perspective view of the bearing plate of the present invention with one corner cut away to illustrate the profile of the bearing plate.
Figure 3:
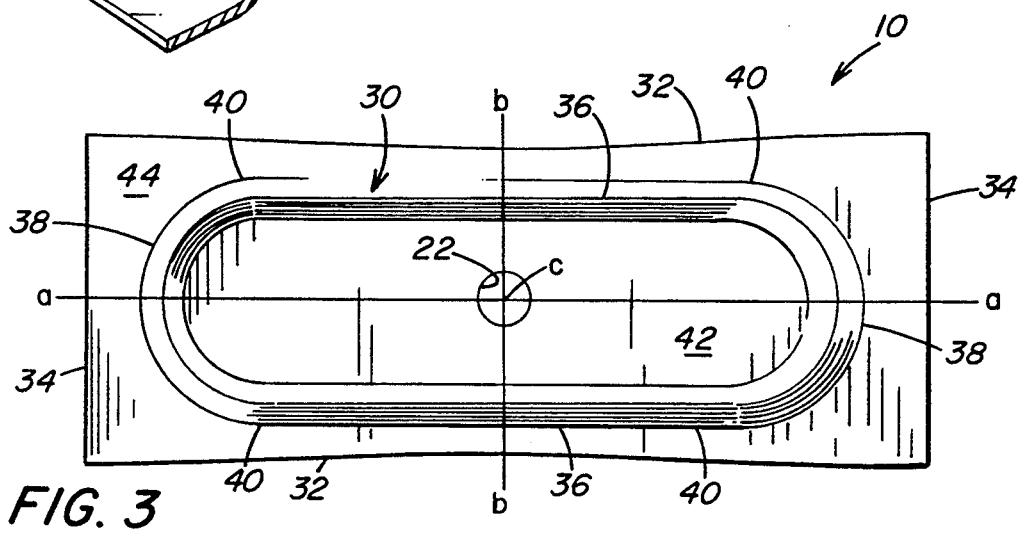
FIG. 3 is a top plan view of the bearing plate of the present invention.

Referring to the drawings, and particularly to FIGS. 1, 2 and 3, there is illustrated a bearing plate generally designated by the numeral 10 for use in supporting the area of a mine roof 12 adjacent a bore hole 14. The bearing plate 10 is brought into abutment with and tensioned against the mine roof 12 by means of a mine roof bolt 16 which is anchored in the bore hole 14 by mechanical means such as the expansion assembly 18 or by other appropriate means. The mine roof bolt 16 has a headed end 20 which extends downwardly into the mine from the bore hole 14. The headed end 20 of mine roof bolt 16 are suitable washers 24 engage the bearing plate 10 around aperture 22. When torque is applied to the anchored mine roof bolt 16, the bolt 16 is tensioned in the bore hold 14 and the bearing plate 10 is drawn up against the mine roof 12 by the abutment of bearing surface 26 of bearing plate 10 against mine roof 12.

The bearing plate 10 of the present invention has an opposite or second surface 28 from which extends a continuous generally elliptical embossment designated by the numeral 30.

Bearing plate 10 has a generally rectangular configuration defined by side walls 32 and end walls 34. Side walls 32 have a length greater than the length of end walls 34. Bearing plate 10 has a longitudinal axis a parallel to side walls 32 and a transverse axis b parallel to end walls 34. Longitudinal axis a intersects transverse axis b at a juncture or intersection point c which is substantially the midpoint of the bearing plate 10. Aperture 22 is concentrically disposed around the intersection c of longitudinal axis a and transverse axis b.

As can best be seen in FIG. 3, the bearing plate 10 continuous embossment 30 has side wall generally linear embossed portions 36 which extend along side walls 32 on each side of bearing plate 10, and curved end portions 38 which curve adjacent to end walls 34 and are joined to and form an integral portion of the side wall embossed portions 36 at a location 40 to provide bearing plate 10 with a continuous elliptical embossment 30 along the perimeter of bearing plate 10.

Continuous elliptical embossment 30 divides the opposite surface 28 and bearing surface 26 into an inner portion 42 and an outer portion 44 on opposite sides of continuous elliptical embossment 30. Inner portion 42 and outer portion 44 of bearing surface 26 are in the same plane such that both inner and outer portions 42 and 44 of bearing surface 26 abut mine roof 12. Continuous elliptical embossment 30 provides bearing plate 10 with an embossed reinforcement to prevent buckling or a "bow tie" effect such that the end walls 34 will not bend downwardly into the mine shaft due to force exerted upon the opposite surface 26 inner portion 42 when the bolt 16 (see FIG. 1) is torqued into the bore hole 14 after anchoring by the expansion assembly 18 or other means to thus compress the rock strata in the mine roof 12. The continuous elliptical embossment 30 provides bearing plate 10 with additional strength without a substantial increase in the amount of metal used to form bearing plate 10. As the stresses on the bearing plate 10 are transmitted from one portion of the continuous elliptical embossment 30 to other portions of the embossment 30 due to the continuous configuration of the continuous embossed area 30, increased stress at local points on the bearing plate 10 are taken up by the bearing plate 10 without an increase in the thickness of the metal used to form bearing plate 10. The continuous elliptical embossment 30 in the preferred embodiment of the bearing plate 10 extends from opposite surface 28 a distance of 0.75 inches, such that continuous elliptical embossment 30 does not significantly reduce the headroom in the mine when bearing plate 10 is installed against the mine roof.

Figure 4:
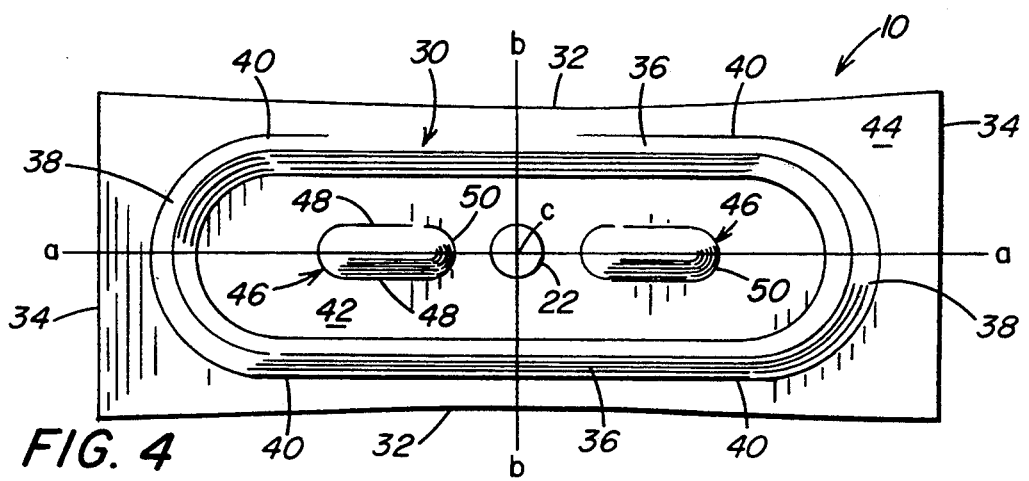
FIG. 4 is a top plan view of another embodiment of the present invention.

In the embodiment of FIG. 4, there is provided a bearing plate generally designated by the same numerals as the plate illustrated in FIG. 1. The continuous elliptical embossment 30 divides the bearing plate 10 surfaces 26 and 28 into an inner portion 42 and an outer portion 44 which are in the same plate on opposite sides of continuous elliptical embossment 30. Inboard embossed areas are generally designated at 46. The inboard embossed areas 46 of the bearing plate 10 in the embodiment of FIG. 4 are inboard of continuous elliptical embossment 30 and have a pair of side walls 48 parallel to the longitudinal axis a of the bearing plate 10, and curved end walls 50 connecting the side walls 48. The side walls 48 of the inboard embossed area 46 have a length greater than the length of end walls 50 of inboard embossed areas 46. Inboard embossed areas 4 are disposed equidistantly on either side of aperture 22, and assist in centering the washer 24 (see FIG. 1) on mine roof bolt 16 around aperture 22 when installing bearing plate 10. Inboard embossed areas 46 also add rigidity to the inner portion 42 of the bearing plate 10. Inboard embossed areas 46 extend from the opposite surface 28 of the bearing plate 10 parallel to the longitudinal axis a and the side walls 48.

In the embodiment of FIG. 5, there is illustrated a bearing plate 10 having the same numerals for the same elements as FIG. 1. The bearing plate 10 in FIG. 4 has a longitudinal axis a parallel to the side walls 32 and a transverse axis b parallel to the end walls 34 which intersect at the midpoint of the bearing plate 10 to form an intersection point c around which an aperture 22 is concentrically provided. Inboard embossed areas generally designated at 56 are aligned along the longitudinal axis of the bearing plate 10 equidistantly on either side of aperture 22 inboard of continuous elliptical embossment 30. Inboard embossed areas 56 have curved end walls 58 and side walls 60 with side walls 60 parallel to the transverse axis b and perpendicular to the longitudinal axis a. Side walls 60 are longer than end walls 58. Inboard embossed areas 56 add rigidity to the inner portion 42 of opposite surface 28 and assist in centering washer 24 around aperture 22.

In the embodiment of FIG. 6, again the plate is provided with the same numerals as FIG. 1. Continuous elliptical embossment 30 divides the bearing plate 10 surfaces 26 and 28 into an inner portion 42 and an outer portion 44 on opposite sides of continuous elliptical embossment 30. Surfaces 26 and 28 inner portion 42 and outer portion 44 are in the same plane. Inboard embossed areas generally designated at 62 are provided along the longitudinal axis a of the bearing plate 10 on either side of aperture 22 inboard of continuous elliptical embossment 30. Inboard embossed areas 62 extend from the opposite surface 28 and comprise end walls 64 adjacent aperture 22 which are parallel to transverse axis b and extend vertically from the opposite surface 28. Planar top walls 66 define the highest point of inboard embossed areas 62 and extend from end walls 64 parallel to transverse axis b to connect end walls 64 to sloping walls 68. Sloping walls 68 connect planar top walls 66 to the opposite surface 28 inner portion 42 and slope from the planar top walls 66. Inboard embossed areas 62 provide bearing plate 10 inner portion 42 with additional rigidity to withstand stresses applied adjacent aperture 22 by the washer 24 when the mine roof bolt 16 (see FIG. 1) is torqued into the bore hole 14 to tension the bearing plate 10 against the mine roof 12 to compress the rock strata adjacent the bore hole 14. Inboard embossed areas 62 also provide a means for centering washer 24 around aperture 22 for proper alignment and ease of assembly.

The provision of a bearing plate 10 with a continuous elliptical embossment 30 along the perimeter thereof substantially increases the rigidity of the bearing plate 10 and the resistance of the bearing plate 10 to stresses. As the stresses on the bearing plate 10 are transmitted from one portion of the continuous elliptical embossment 30 to other portions, due to the continuous configuration of the embossment 30, increased stress at local points on the bearing plate 10 are absorbed by the bearing plate 10 without a substantial increase in the thickness of the metal used to form bearing plate 10.

According to the provisions of the Patent Statutes, I have explained the principal, preferred construction and mode of operation of my invention and have illustrated and described what I now consider to represent its best embodiments. However, it should be understood that within the scope of the appended claims, the invention may be practiced otherwise than as specifically illustrated and described.

I claim:

1. A bearing plate for supporting a generally flat planar surface comprising, a plate having a bearing surface and an opposite surface, a pair of side walls and a pair of end walls defining a perimeter of said plate, said plate having a length greater than a width with a longitudinal axis extending substantially parallel to said side walls, a transverse axis substantially parallel to said end walls, said longitudinal and said transverse axes intersecting at the midpoint of said bearing plate, an aperture in said plate at a location where said longitudinal and transverse axes intersect, a continuous embossment extending continuously on said plate and positioned closer to said perimeter than to said aperture of said plate, said continuous embossment projecting outwardly from said opposite surface to increase the rigidity of said plate along said perimeter, said continuous embossment dividing said bearing plate into an inner portion and an outer portion, said inner and outer portions being in the same plane and positioned on opposite sides of said continuous embossment with said outer portion limited to an area closely adjacent to said perimeter, said continuous embossment including side wall linear embossed portions extending along said side walls and end wall arcuate embossed portions extending along said end walls, said end wall arcuate embossed portions extending closely adjacent to said pair of end walls and being joined to said side wall linear embossed portions to form integral embossed portions and provide a continuous embossment along said perimeter of said side walls and said end walls, said continuous embossment extending outwardly from said opposite surface a uniform distance along the entire length of said continuous embossment, and said continuous embossment positioned to reinforce said plate along said perimeter and allow stresses applied to said plate at said end walls to be transmitted form said end wall arcuate embossed portions to said side wall linear embossed portions to prevent buckling of said plate at said end walls.

2. The bearing plate as set forth in claim 1 in which, said side walls have a greater length than said end walls to provide said bearing plate with a rectangular configuration.

3. The bearing plate as set forth in claim 2 in which, said continuous embossment linear portions extend substantially parallel to said side walls, and said continuous embossment arcuate portions are connected to said continuous embossment linear portions adjacent said end walls.

4. The bearing plate as set forth in claim 1 which includes, inner embossed areas extending from said opposite surface in said inner portion of said bearing plate.

5. The bearing plate as set forth in claim 4 in which, said inner embossed areas extend along said longitudinal axis of said plate on either side of said aperture.

6. The bearing plate as set forth in claim 5 in which, said inner embossed areas are spaced from said aperture in said plate a distance sufficient to center a washer over said aperture on said opposite surface.

7. The bearing plate as set forth in claim 6 in which, said inner embossed areas extend vertically from said opposite surface of said bearing plate adjacent said aperture and thereafter slope toward said opposite surface of said bearing plate.

8. The bearing plate as set forth in claim 4 in which, said continuous embossment and said inner embossed areas extend the same distance from said opposite surface.

9. A bearing plate for supporting a generally flat planar surface comprising, a plate having a bearing surface and an opposite surface, a pair of side walls and a pair of end walls defining a perimeter of a polygonal bearing plate having a length greater than a width, said bearing plate having a longitudinal axis intersecting a transverse axis at a midpoint of said bearing plate, a continuous embossment extending a preselected distance outwardly from said opposite surface, said continuous embossment being positioned closer to said perimeter than to said bearing plate midpoint to provide increased rigidity to said bearing plate and divide said bearing plate into an inner portion and an outer portion, said inner and outer portions of said plate being in the same plane with said outer portion limited to an area closely adjacent to said perimeter, said continuous embossment including curved segments and linear segments, and said curved segments closely spaced from said end walls to reinforce said perimeter along said end walls and said linear segments closely spaced from said side walls to reinforce said perimeter along said side walls and form said continuous embossment to withstand stresses along said perimeter by transmitting stresses on said plate end walls from said curved segments to said linear segments due to the continuous configuration of said embossment along said perimeter.

* * * * *

UNITED STATES PATENT AND TRADEMARK OFFICE
CERTIFICATE OF CORRECTION

PATENT NO. : 5,445,477
DATED : August 29, 1995
INVENTOR(S) : Frank Calandra, Jr.

It is certified that error appears in the above-indentified patent and that said Letters Patent is hereby corrected as shown below:

Column 1 Line 24 "of a mine" should read --of mine--.

Column 3 Line 34 "if" should read --is--.

Column 4 Line 11 "the aperture" should read --an aperture--.

Column 4 Line 24 "There" should read --These--.

Column 4 Line 59 "are" should read --and--.

Column 4 Line 62 "hold" should read --hole--.

Claim 1 Line 51 Column 7 "form" should read --from--.

Signed and Sealed this

Twenty-sixth Day of March, 1996

Attest:

BRUCE LEHMAN

Attesting Officer     Commissioner of Patents and Trademarks